United States Patent [19]

Wilkinson

[11] 4,417,384
[45] Nov. 29, 1983

[54] MEMBERS FOR SUPPORTING A MOVABLE LOAD

[75] Inventor: Thomas Wilkinson, Andover, England

[73] Assignee: Hancock Cutting Machines Limited, England

[21] Appl. No.: 298,419

[22] Filed: Sep. 1, 1981

[30] Foreign Application Priority Data

Oct. 2, 1980 [GB] United Kingdom ............ 8031824

[51] Int. Cl.³ .................................... B23P 19/04
[52] U.S. Cl. .................................. 29/526 R; 29/460;
52/585; 52/730; 52/731; 266/67; 266/69;
266/77; 269/73; 308/3 A
[58] Field of Search .............. 266/67, 69, 77; 52/105,
52/365, 730, 731, 585; 29/460, 526 R; 308/3 A;
269/73

[56] References Cited

U.S. PATENT DOCUMENTS 3,109,640 11/1963 Schneckloth .................... 269/73
3,114,223 12/1963 Hammond ........................ 269/73

*Primary Examiner*—W. Stallard
*Attorney, Agent, or Firm*—Lerner, David, Littenberg, Krumholz and Mentlik

[57] ABSTRACT

An elongate member capable of forming a part of a support structure for a coordinate machine tool comprises a first relatively rigid elongate part 11 for supporting the weight of a movable load, a second relatively resilient elongate part 12 for locating the movable load on the elongate member, and a plurality of spaced dowels 13 engaging said first and second parts 11, 12 for locating said second part 12 at a predetermined position spaced from the first part 11. The first part 11 is provided with counterbores each of which accommodate a shoulder on each dowel which shoulder accurately locates and spaces the second part 12 relative to the first part 11.

8 Claims, 9 Drawing Figures

MEMBERS FOR SUPPORTING A MOVABLE LOAD

BACKGROUND OF THE INVENTION

The present invention relates to elongate members for supporting and locating a load movable in opposite senses along the length of the members and in particular, to such elongate load supporting and locating members when they form part of a support structure for a coordinate machine tool.

In this specification the expression "coordinate machine tool" is intended to embrace machine tools having a working point or surface which can be located relative to a workpiece by means of "X—X" and "Y—Y" coordinates. For the avoidance of doubt, the expression coordinate machine tool includes flame cutting machines which consist essentially of a cutting torch mounted on a carriage for movement therewith. The carriage can be driven in opposite senses along a beam which in turn is mounted for movement on a pair of spaced parallel rails. The cutting torch is capable of movement in an "X—X" sense by means of the drive to the carriage and in a "Y—Y" sense by movement of the beam along the rails.

The support structure, that is, the beam and rails of a flame cutting machine must be sufficiently rigid to support the load of the cutting torch, the carriage and ancillary equipment associated therewith. The support structure must also incorporate locating surfaces in order that the cutting torch can be located accurately in the "X—X" and "Y—Y" planes with respect to a workpiece. In flame cutting machines having a tracing width of one 1½ to 2½ meters, and a cutting width of from 0 to 2½ meters, the rails and the beam have to be of substantial rigidity and their very size and weight makes it difficult and expensive for locating surfaces to be machined on these parts or attached to the parts.

For example, a pair of spaced rails on a known flame cutting machine are of the locomotive type. That is to say, they resemble the rails supporting rolling stock on a railway. The rails have first to be shot-blasted for descaling purposes and then by means of a press straightened to some rough degree of alignment. They are then stress relieved to reduce rolling and bending stresses and then introduced to a machine tool for planing the top and sides of each rail. It is the planing operation which produces the accurate surfaces for location purposes. Both rails are then drilled to accommodate holding down bolts and the rails are then painted. In a typical operation this procedure can consume 8½ hours of time.

On the same machine the beam, which is a hot-rolled box-section, is first shot-blasted and then four individual strips are first degreased, then fabricated and welded to the four corners of the box-section. Although only two of the strips are used for locating purposes, four strips have to be welded to avoid distortion during the welding operation. The welds are ground flush and then the strips are planed to provide accurate locating surfaces. The beam is then drilled and finally painted with the working surfaces of the strips being masked to avoid spoiling the locating surfaces. This operation can take up to 54 hours.

OBJECTS OF THE INVENTION

It is an aim of the present invention to provide an elongate member for supporting and locating a load movable in opposite senses along the member, which member can be incorporated into the support structure of a coordinate machine tool and which is economic to manufacture when compared to known methods of manufacture.

SUMMARY OF THE INVENTION

According to one aspect of the present invention an elongate member for supporting and locating a load movable in opposite senses along the length of the member comprises a first relatively rigid elongate part of supporting the weight of the movable load, a second relatively resilient elongate part for locating the movable load onthe elongate member, a plurality of spaced dowels extending in a straight line, the dowels engaging said first and second parts for locating said second part at a predetermined position spaced from said first part, and means for fastening the first and second parts together.

According to a further aspect of the present invention a method of making an elongate member for supporting and locating a load movable in opposite senses along the length of the member, comprises the steps of taking a first relatively rigid elongate part for supporting the movable load and machining holes each with an associated counterbore in a straight line along the length of said first part, taking a second relatively resilient elongate part for locating the movable load on the elongate member and machining holes at the same pitch distance as the holes in the first part and extending in a straight line along the length of said second part, placing a dowel in each hole in the first part, each dowel having a shoulder intermediate its ends which is received by the associated conterbore of each hole and then locating said second part relative to said first part by means of said dowels, the shoulder of each dowel spacing the first part from the second part; and fastening said first and second parts together.

BRIEF DESCRIPTION OF DRAWINGS

Embodiments of the invention wil now be described, by way of example, reference being made to the Figures of the accompanyingdiagrammatic drawings in which.

DESCRIPTION OF PREFERRED EMBODIMENTS

Figure 1:
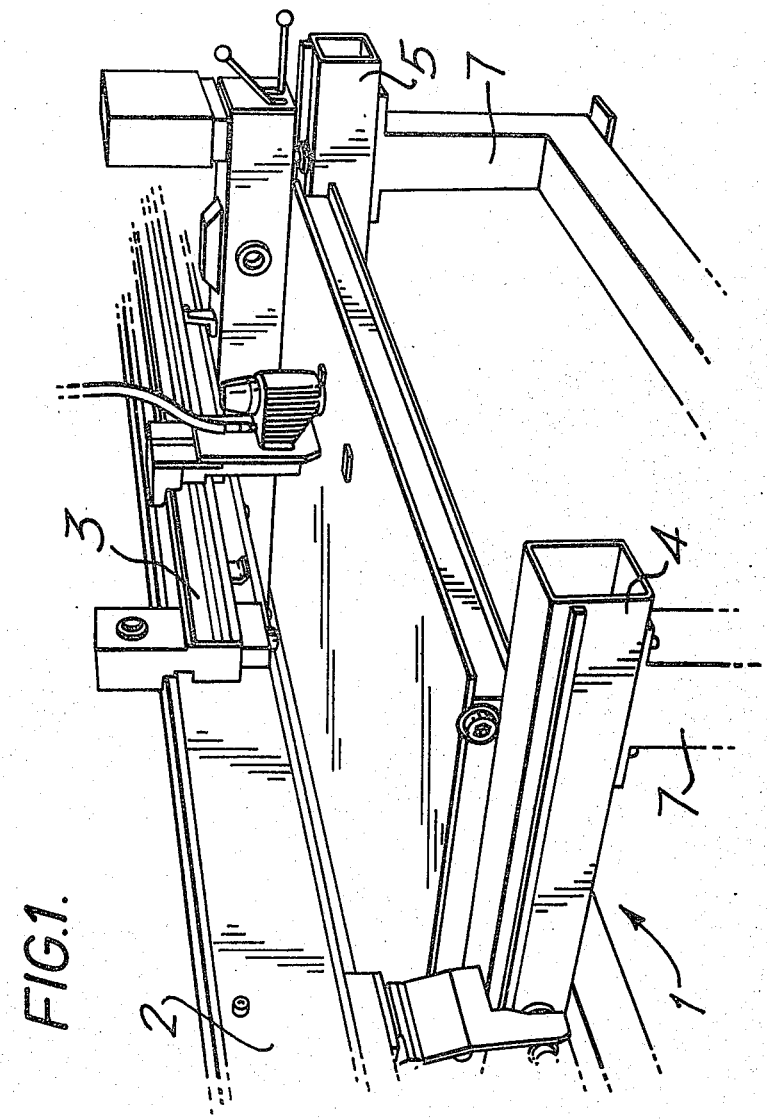
FIG. 1 is a perspective view of a flame cutting machine.
Figure 2:
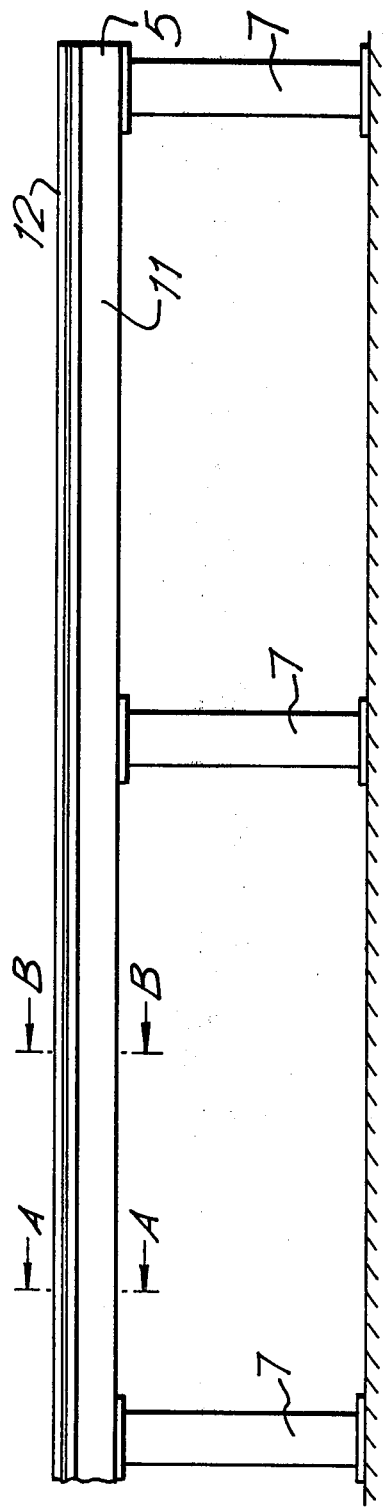
FIG. 2 is a side elevation illustrating the rails forming part of the support structure of the flame cutting machine of FIG. 1.

As shown in FIG. 1, a flame cutting machine 1 includes a beam 2 on which is supported a carriage 3. The carriage 3 can be driven in opposite senses along the length of the beam by means (not shown) for locating a cutting torch at a predetermined position over a workpiece.

The carriage 3 is supported for movement along two spaced parallel rails 4,5. The rail 4 is known in the art as a secondary rail, whilst the rail 5 is known as a primary rail. The rails 4,5 are supported on spaced pillars 7.

It will be evident, that movement of the carriage 3 along the beam 2 provides a cutting torch with motion in the "X—X" plane whilst movement of the beam 2 along the rails 4,5 provides motion of the cutting torch in the "Y—Y" plane.

Figure 3:
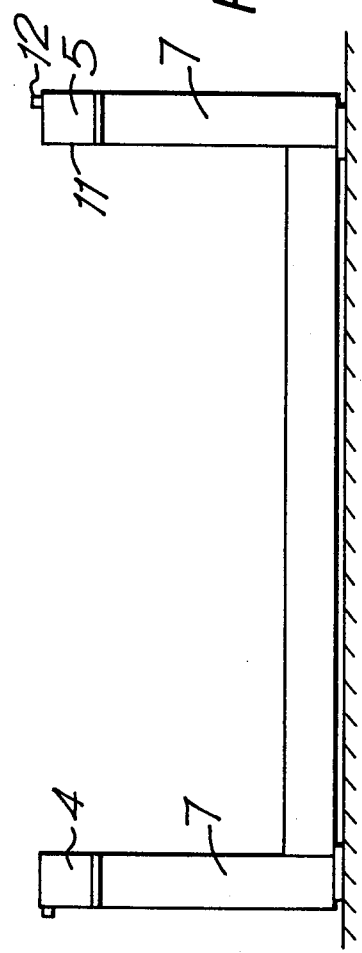
FIG. 3 is an end view of the rails illustrated in FIG. 2.
Figure 4:
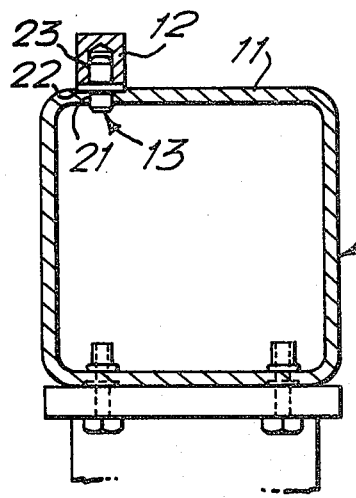
FIG. 4 is a cross-section on the line A—A in FIG. 2.

Referring also to FIGS. 2 to 6, the rails 4,5 are substantially identical and when forming part of the support structure of the flame cutting machine 1 are oriented parallel with respect to each other, but with their cross-sections at 90° with respect to each other (see FIG. 3). The rail 5 is in the form of an elongate member comprising a first relatively rigid elongate part 11 and a second relatively resilient elongate part 12. The first part 11 has a hollow box-shaped cross-section and is manufactured by cold rolling. The box-shaped configuration of the cross-section gives the part 11 a high moment of inertia in the vertical or "Z—Z" plane and therefore the ability to support heavy loads without unacceptable flexure.

The second part 12 has a solid rectangular cross-section and is made from precision straightened strip. The strip is resilient relative to the first part 11. The parts 11,12 are interconnected accurately with respect to each other by means of dowels 13. Each dowel 13 has a first cylindrical part 14, a second cylindrical part 15 and a shoulder 16 intermediate the first and second cylindrical parts 14, 15. The free end of the cylindrical part 15 is provided with a radius 17 for reasons that will be explained later.

Figure 5:
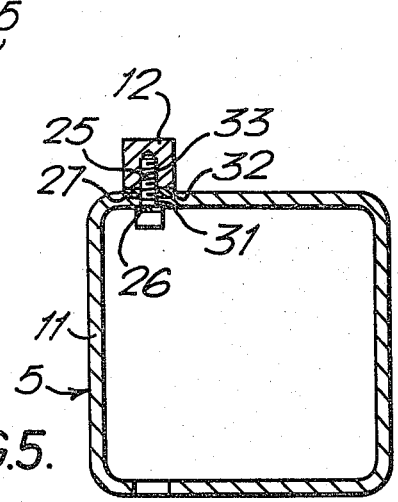
FIG. 5 is a cross-section on the line B—B of FIG. 2.
Figure 6:
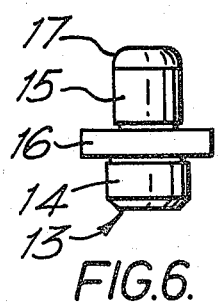
FIG. 6 is an elevation of a dowel forming part of the support structure.

The parts 11,12 are fastened together by bolts 25, spring washers 26 and spacers 27 (see FIG. 5).

Figure 8:
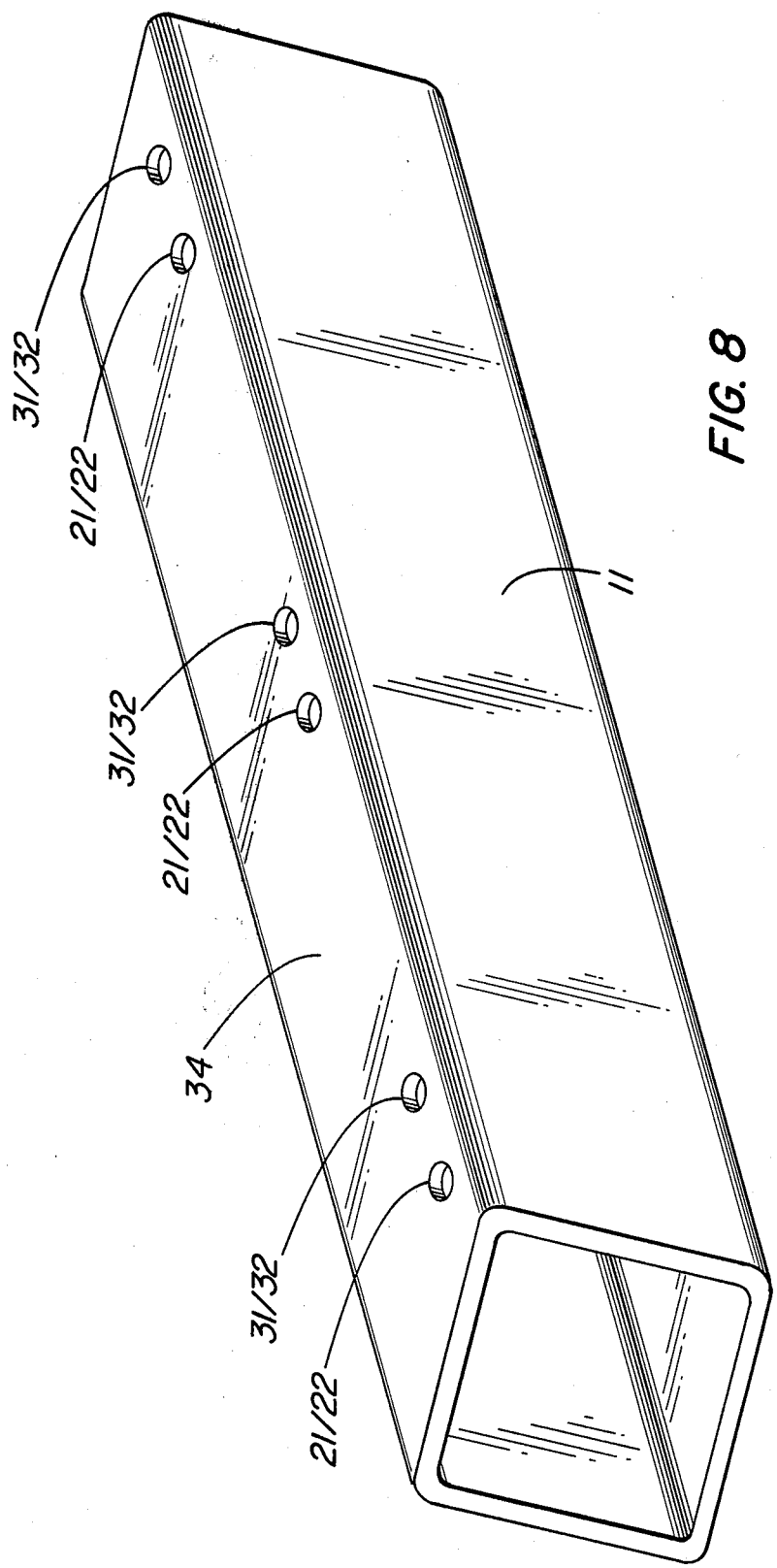
FIG. 8 is a side, perspective, elevational view of a first portion of a rail in accordance with the present invention.
Figure 9:
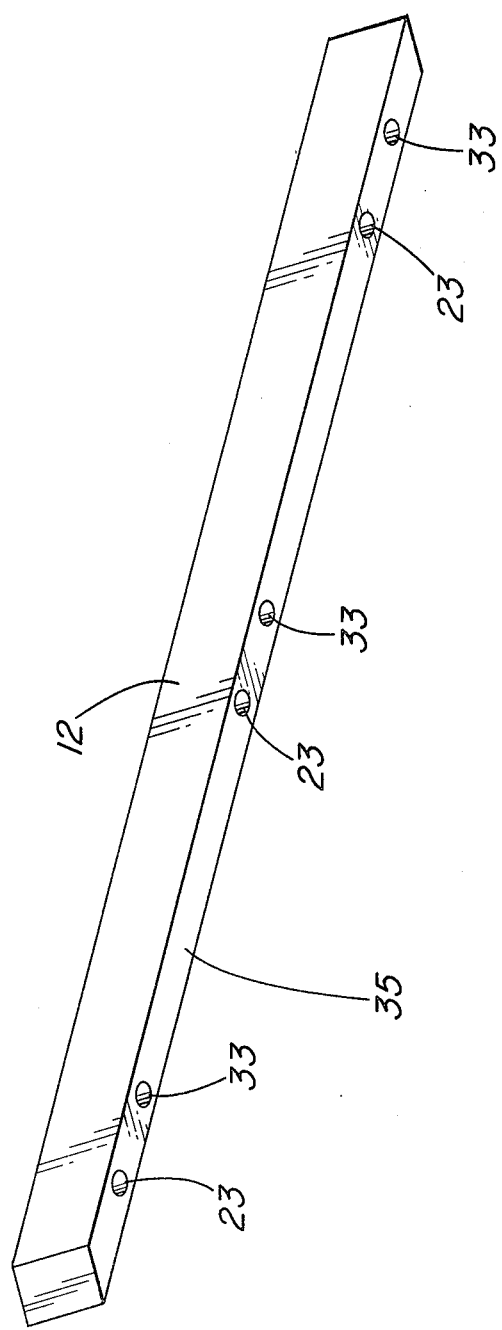
FIG. 9 is a side, perspective, elevational view of the second portion of a rail in accordance with the present invention.

When it is decided to manufacture a rail 4,5 a first part 11 and a second part 12 each of a preselected length are first degreased. Next, a first locating group of though holes 21 with associated counterbores 22 are formed in one surface 34 of the first part 11 as shown in FIG. 8. At the same pitch distances, blind holes 23 are also formed on one surface 35 of the second part 12, as shown in FIG. 9. At the same time a second group of fastening holes are machined in the part 11, namely clearance through holes 31 and associated counterbores 32. At the same time a corresponding group of threaded holes 33 are tapped in the part 12 at the same pitch distance as the clearance holes 31 and counterbores 32. The holes of each group in the parts 11,12 are arranged in a straight line on surfaces 34 and 35, respectively. At this stage, the second part 12 can be treated to provide it with a hard chrome surface prior to its attachment to the second part 11. Also at this stage, the part 11 can be painted.

Dowels 13 are now located in the holes 21 in the part 11 such that the first cylindrical part 14 of each dowel 13 enters a through hole 21 and its shoulder 16 is accommodated by the associated counterbore 22. It will be seen from FIG. 4 that the upper (as shown) surface of the shoulder 16 is at a level above that of the outer surface of the part 11. It should be pointed out, that the upwardly (as shown) facing surface of the counterbore is, in effect, a datum surface and should the counterboring operation not clean up the surface of the part 11 because, for example, the part 11 is distorted, then said part 11 must be rejected. The part 12 is then introduced to the part 11 such that the cylindrical part 15 of each dowel enters a hole 23 in the part 12. To this end, the radius 17 assists in locating each hole 23 over its associated dowel 13. This has the effect of straightening up to an accurate degree the part 12 which prior to this time could have been slightly distorted. The fact that the part 12 is resilient compared to the part 11 enables the dowels 13 to make the part 12 conform to the required straightness.

Finally, the parts 11,12 are fastened together by means of bolts 25 which pass through clearance holes 31 in the part 11 and into threaded holes 33 in the part 12. Spacers 27 are provided which have substantially the same thickness as the shoulders 16 of the dowels 13 and are accommodated in the counterbores 32. The spacers 27 thereby help to maintain the spacing between the part 12 relative to the part 11.

It has been found, that using the method described above, a pair of rails can be produced in just over 1 hour. The economy of manufacture is startling when compared to the prior art methods of manufacture and there is no loss of rigidity or accuracy.

Figure 7:
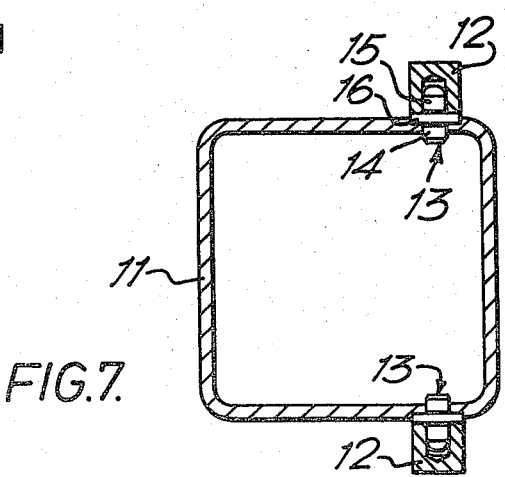
FIG. 7 is a cross-section through a beam forming part of the support structure of a flame cutting machine.

Referring to FIG. 7, this illustrates diagrammatically a beam which can be used together with the rails 4 and 5 to form a support structure for a coordinate machine. The beam differs from the rails 4,5 only in that there are two parts 12 associated with a part 11. The method of manufacture is substantially identical to the manufacture of the rails.

What is claimed is:

1. An elongated member for supporting and locating a load movable along the length of said elongated member, said elongated member comprising a first relatively rigid elongated part for supporting the weight of said movable load, a second relatively resilient elongated part for locating the movable load on said elongated member, a plurality of spaced dowels extending along the length of said elongated member, said dowels engaging said first and second parts for locating said second part at a predetermined position with respect to said first part, and means for fastening said first and second parts together.

2. An elongated member as set forth in claim 1, in which said first relatively rigid elongated part has a hollow box-shaped cross-section and a plurality of through-holes, each including an associated counterbore, extending along at least one surface thereof, each of said plurality of through-holes and associated counterbores being adapted to receive a portion of one of said plurality of dowels, and said second relatively resilient elongated part having a solid rectangular cross-section, and including one surface formed with a plurality of holes adapted to receive a further portion of one of said plurality of dowels.

3. The elongated member as set forth in claim 2 in which each of said plurality of dowels includes a first end, a second end, and a shoulder therebetween, said shoulder being adapted to be received within one of said plurality of associated counterbores in said first part, whereby a surface of said shoulder engages said one surface of said second part so as to accurately locate said second part at a position spaced from said at least one surface of said first part.

4. A support structure for a coordinate machine tool, comprising a beam adapted to support a carriage movable therealong, said beam being support by first and second spaced, parallel rails for movement of said beam in a direction parallel to said rails, the direction of movement of said beam being at right angles to the direction of movement of said carriage along said beam, at least one of said first and second rails and said beam comprising an elongated member including a first relatively rigid elongated part for supporting the weight of said movable load, a second relatively resilient elongated part for locating said movable load on said elongated member, a plurality of spaced dowels extending along the length of said elongated member, said dowels engaging said first and second parts for locating said second part at a predetermined position with respect to said first part, and means for fastening said first and second parts together.

5. An elongated member for supporting and locating a load movable along the length of said member, said elongated member comprising a first relatively rigid elongated part having a hollow boxed-shaped, cross-section and a plurality of through-holes, each with an associated counterbore extending along at least one surface thereof, a second relatively resilient elongated part for locating said movable load on said elongated member, said second relatively resilient elongated part having a solid rectangular cross-section, and including one surface formed with a plurality of holes, a plurality of dowels, each dowel including a first end, a second end, and a shoulder therebetween, whereby said plurality of dowels may be inserted into both said plurality of through-holes in said first part and said plurality of holes in said second part, respectively, with said shoulder being received within said associated counterbores in said first part with a surface of said shoulder engaging said one surface of said second part, so as to accurately locate said second part at a position spaced from said at least one surface of said first part, and means for fastening said first and second parts together.

6. The elongated member as set forth in claim 5 in which said fastening means comprises bolt means, washer means, and spacer means, said spacer means having substantially the same thickness as said shoulder of said dowel.

7. A method of making an elongated member for supporting and locating a load movable along the length of said member, comprising the steps of providing a first relatively rigid elongated part for supporting said movable load, machining holes, each including an associated counterbore, along the length of said first part, providing a second relatively resilient elongated part for locating said movable load on said elongated member, machining holes at the same pitch distance as said holes in said first part and extending along the length of said second part, placing a dowel in each hole in said first part, each of said dowels having a shoulder intermediate its ends which is received by said associated counterbore in each hole, and locating said second part relative to said first part by means of said dowels, said shoulder of each dowel spacing said first part from said second part, and fastening said first and second parts together.

8. The method as set forth in claim 7 including providing said second part with a hard chrome finish prior to fastening said second part to said first part.

* * * * *